(12) United States Patent
Matsuo et al.

(10) Patent No.: US 11,473,640 B2
(45) Date of Patent: Oct. 18, 2022

(54) LOAD ABSORBING MEMBER AND VEHICLE LOAD ABSORBING STRUCTURE

(71) Applicant: TOYOTA JIDOSHA KABUSHIKI KAISHA, Aichi-ken (JP)

(72) Inventors: Yasuhide Matsuo, Toyota (JP); Ayaka Kagami, Inazawa (JP); Hatsumi Matsui, Toyota (JP); Masaya Miura, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 123 days.

(21) Appl. No.: 17/135,822

(22) Filed: Dec. 28, 2020

(65) Prior Publication Data

US 2021/0270339 A1   Sep. 2, 2021

(30) Foreign Application Priority Data

Feb. 28, 2020   (JP) .............................. JP2020-034309

(51) Int. Cl.
| | |
|---|---|
| *B60J 7/00* | (2006.01) |
| *F16F 7/12* | (2006.01) |
| *B60R 19/34* | (2006.01) |
| *B62D 21/15* | (2006.01) |
| *B60R 19/18* | (2006.01) |

(52) U.S. Cl.
CPC .............. *F16F 7/12* (2013.01); *B60R 19/34* (2013.01); *B62D 21/15* (2013.01); *B60R 2019/1853* (2013.01); *F16F 2224/0241* (2013.01)

(58) Field of Classification Search
CPC .... G06F 3/0616; G06F 3/0688; G06F 3/0629; G06F 3/0634; H04N 19/176; A61P 43/00; Y02P 40/57; A47C 27/085; F02B 2075/027; Y02E 60/10
See application file for complete search history.

(56) References Cited

U.S. PATENT DOCUMENTS

| | | | |
|---|---|---|---|
| 6,439,650 B2 * | 8/2002 | Artner ................. | B62D 21/152 296/203.02 |
| 7,066,509 B2 * | 6/2006 | Kollaritsch ............ | B60R 19/34 293/133 |
| 7,357,432 B2 * | 4/2008 | Roll ....................... | B60R 19/18 293/133 |

(Continued)

FOREIGN PATENT DOCUMENTS

JP   2017227276 A   12/2017

*Primary Examiner* — Kiran B Patel
(74) *Attorney, Agent, or Firm* — Hauptman Ham, LLP (57) ABSTRACT

In a crash box, a first extending portion extends from a front end of a first body upper portion in a vehicle front-rear direction of a first body portion, and a second extending portion extends from a front end of a second body lower portion in a vehicle front-rear direction of a second body portion. When an impact load is transmitted to the front ends of the first body portion and the second body portion in the vehicle front-rear direction, a rotation moment toward the lower side of the vehicle acts on the first extending portion and a rotation moment toward the upper side of the vehicle acts on the second extending portion. This can suppress peeling between first and second left side bonded portions and between first and second right side bonded portions of the first body portion and the second body portion.

7 Claims, 6 Drawing Sheets

(56) References Cited

U.S. PATENT DOCUMENTS

| | | | | |
|---|---|---|---|---|
| 7,413,226 | B2* | 8/2008 | Muskos | B60R 19/34 293/133 |
| 7,631,924 | B2* | 12/2009 | Nilsson | B60R 19/34 296/133 |
| 7,871,122 | B2* | 1/2011 | Salomonsson | B60R 19/34 296/187.03 |
| 8,622,446 | B2* | 1/2014 | Handing | B60R 19/18 293/155 |
| 9,126,551 | B2* | 9/2015 | Impero | F16F 7/12 |
| 9,290,140 | B2* | 3/2016 | Matsushiro | B60R 19/34 |
| 9,446,725 | B2* | 9/2016 | Yamada | B62D 25/082 |
| 9,522,644 | B2* | 12/2016 | Prasoody | B60R 19/18 |
| 9,539,968 | B2* | 1/2017 | Nishida | B60R 19/34 |
| 9,656,623 | B2* | 5/2017 | Ahn | B60R 19/023 |
| 9,676,353 | B2* | 6/2017 | Sotoyama | B60R 19/34 |
| 9,828,032 | B2* | 11/2017 | Watanabe | B62D 21/152 |
| 9,919,668 | B2* | 3/2018 | Kitakata | B62D 29/008 |
| 9,932,007 | B2* | 4/2018 | Hashimoto | B60R 19/34 |
| 2009/0085362 | A1* | 4/2009 | Terada | B60R 19/34 293/132 |
| 2016/0039373 | A1* | 2/2016 | Yamada | B62D 21/152 293/132 |

\* cited by examiner

LOAD ABSORBING MEMBER AND VEHICLE LOAD ABSORBING STRUCTURE

CROSS-REFERENCE TO RELATED APPLICATION

This application claims priority to Japanese Patent Application No. 2020-034309 filed on Feb. 28, 2020, incorporated herein by reference in its entirety.

BACKGROUND

1. Technical Field

The present disclosure relates to a load absorbing member that absorbs at least a part of a load that acts at the time of a vehicle collision and the like, and a vehicle load absorbing structure to which a crash box that is one mode of such a load absorbing member is applied.

2. Description of Related Art

For example, an energy absorbing member disclosed in Japanese Unexamined Patent Application Publication No. 2017-227276 (JP 2017-227276 A) below is formed in a cylindrical shape by a fiber reinforced resin material. A penetrating direction of the energy absorbing member is a vehicle front-rear direction, and an impact load input to a front bumper beam at a time of a vehicle front collision is transmitted to the front end of the energy absorbing member in the vehicle front-rear direction via a load transmitting member.

When the magnitude of the impact load transmitted to the energy absorbing member exceeds the mechanical strength of the energy absorbing member against the compressive load in the vehicle front-rear direction (penetrating direction), the energy absorbing member deforms. Further, the deformation of the energy absorbing member due to the impact load is controlled by a first wall portion and the like provided on the load transmitting member, and thus the energy absorbing member is deformed so as to be compressed from the front of the vehicle by the impact load.

It is conceivable that the energy absorbing member is formed by bonding a plurality of body portions having a U-shaped cross section and that are open in a direction orthogonal to the penetrating direction of the energy absorbing member to each other such that the body portions face each other. In the energy absorbing member having such a configuration, when the impact load as described above is input to the energy absorbing member, the energy absorbing member may deform so that the bonded portions of both body portions are peeled off.

SUMMARY

In view of the above facts, an object of the present disclosure is to obtain a load absorbing member and a vehicle load absorbing structure that can suppress the occurrence of peeling at the bonded portions of both body portions due to an input of a load.

The load absorbing member according to claim 1 includes: a pair of body portions made of a fiber reinforced resin material and integrated with each other to define a closed cross-sectional shape that extends in a predetermined penetrating direction. The body portions are configured to deform to crush in the penetrating direction by a load acting in the penetrating direction to absorb at least a part of the load; bonded portions that are provided in each of the body portions, the bonded portions of a first body portion of the body portions and the bonded portions of a second body portion of the body portions being bonded to each other facing each other such that the first body portion and the second body portion are integrated with each other; and an extending portion provided on an opposite side of an input position of the load in the body portions from the bonded portions of the first body portion and the bonded portions of the second body portion, the extending portion extending from at least one of the body portions toward a direction opposite to a direction of the load with respect to the input position of the load.

The load absorbing member according to claim 1 has a closed cross-sectional shape that extends in a predetermined penetrating direction with the bonded portions of a first body portion and the bonded portions of a second body portion of the body portions being bonded to each other facing each other. When a load in the penetrating direction is input to the load absorbing member, the body portions are deformed to crush in the penetrating direction by the load, and thereby at least a part of the load is absorbed.

Further, the load absorbing member has extending portions. The extending portion is provided on at least one of the body portions, and is provided on an opposite side of an input position of the load from the bonded portions of the first body portion and the bonded portions of the second body portion. The extending portion extends toward a direction opposite to a direction of the load with respect to the input position of the load. Therefore, when the above-mentioned load acts on the body portions, the extending portion functions as an arm for a rotation moment based on the above-mentioned load.

The rotation moment acting on the extending portion as described above act to move the bonded portions of the first body portion toward the bonded portions of the second body portion, that is, to bring both bonded portions into tight contact with each other. Therefore, it is possible to suppress the bonded portions of both body portions from being peeled off by the load input to the load absorbing member at the time of a vehicle collision.

According to the load absorbing member of claim 2, in the load absorbing member according to claim 1, the extending portion is provided on both body portions.

In the load absorbing member according to claim 2, the extending portion is provided on both of the body portions. Therefore, when the load at the time of a vehicle collision is input to the load absorbing member, the rotation moment acting on the extending portion of the first body portion causes the bonded portion of the first body portion to press against the bonded portion of the second body portion. On the other hand, the rotation moment acting on the extending portion of the second body portion causes the bonded portion of the second body portion to press against the bonded portion of the first body portion.

That is, in the load absorbing member, the rotation moments acting on both extending portions act so as to bring both bonded portions into tight contact with each other. For this reason, it is possible to effectively suppress both bonded portions from being peeled off due to the load input to the load absorbing member at the time of a vehicle collision.

In the load absorbing member according to claim 1 or 2, the load absorbing member according to claim 3 further includes a reinforcing portion that extends from at least one of the bonded portions of the body portions toward the bonded portions of the second body portion or toward the opposite side of the bonded portions of the second body portion. The reinforcing portion reinforces a rigidity against deformation of the bonded portions of the first body portion in a direction in which the bonded portions of the first body portion are peeled off from the bonded portions of the second body portion.

In the load absorbing member according to claim 3, the reinforcing portion is provided in at least one of the bonded portions of the body portions. The reinforcing portion extends from the bonded portions of the first body portion toward the bonded portions of the second body portion or from the bonded portions of the first body portion toward the opposite side of the bonded portions of the second body portion. By providing the reinforcing portion on one of the bonded portions, the rigidity of the bonded portions of the first body portion is reinforced, and the deformation of the bonded portion of the first body portion in the direction away from the bonded portion of the second body portion is suppressed.

The load absorbing member according to claim 4 includes: a crash box having a pair of body portions made of a fiber reinforced resin material, each of the body portions including bonded portions that are bonded to each other facing each other in a vehicle up-down direction to define a closed cross-sectional shape that extends in a vehicle front-rear direction, the crash box being configured to be compressed and deformed to crush in the vehicle front-rear direction by a load from an outside in the vehicle front-rear direction to absorb at least a part of the load, the crash box further including an extending portion provided further in the vehicle up-down direction from an input position of the load and extending from at least one of the body portions outward in the vehicle front-rear direction with respect to the input position of the load; a supporting member provided inward of the crash box in the vehicle front-rear direction and configured to support the crash box that receives the load from inside in the vehicle front-rear direction; and a bumper reinforcement provided outward of the crash box in the vehicle front-rear direction and configured to transmit the load to the crash box.

In the vehicle load absorbing structure according to claim 4, the crash box includes the pair of body portions. The crash box has a closed cross-sectional shape extending in the vehicle front-rear direction by bonding one of the bonded portions of the body portions and the bonded portions of the other body portion to each other. The bumper reinforcement is provided outward of the crash box in the vehicle front-rear direction, and a load from the outside of the vehicle front-rear direction at the time of a vehicle collision is transmitted to the crash box via the bumper reinforcement. The supporting member is provided inward of the crash box in the vehicle front-rear direction, and when the load is transmitted to the crash box, the supporting member supports the crash box from the inside in the vehicle front-rear direction.

In this state, when the load exceeds the mechanical strength of the crash box against the compressive load in the vehicle front-rear direction, the crash box is deformed to crush so as to be compressed in the vehicle front-rear direction. At least a part of the load is used to deform to crush the crash box, so that at least a part of the load is absorbed.

Here, the crash box is provided with the extending portion. The extending portion is provided outward in the vehicle up-down direction from the input direction of the load in the body portions of the crash box and extending from at least one of the body portions outward in the vehicle front-rear direction with respect to the input position of the load (that is, toward the direction opposite to the direction of the load). When the load is input to the body portion of the crash box, the extending portion acts as an arm for the rotation moment. The rotation moment acting on the extending portion acts so as to bring the body portions into tight contact with each other in the vehicle up-down direction. Thus, it is possible to suppress the bonded portions of the body portions from being peeled off by the load input to the crash box at the time of a vehicle collision.

According to the vehicle load absorbing structure of claim 5, in the vehicle load absorbing structure according to claim 4, the extending portion extends from, of the body portions, the body portion on an upper side in the vehicle up-down direction so as to extend above the bumper reinforcement in the vehicle up-down direction, and extends from the body portion on a lower side in the vehicle up-down direction so as to extend below the bumper reinforcement in the vehicle up-down direction.

In the vehicle load absorbing structure according to claim 5, the extending portion extends from, of the body portions of the crash box, the body portion on the upper side in the vehicle up-down direction so as to extend above the bumper reinforcement in the vehicle up-down direction, and extends from, of the body portions, the body portion on the lower side in the vehicle up-down direction so as to extend below the bumper reinforcement in the vehicle up-down direction. Therefore, when the load at the time of a vehicle collision is input to the vehicle load absorbing structure, the rotation moment acting on the extending portion of the first body portion causes the bonded portion of the first body portion to press against the bonded portion of the second body portion. On the other hand, the rotation moment acting on the extending portion of the second body portion causes the bonded portion of the second body portion to press against the bonded portion of the first body portion.

That is, in the vehicle load absorbing structure, the rotation moments acting on the extending portions act so as to bring the bonded portions into tight contact with each other. Therefore, it is possible to effectively suppress the bonded portions from being peeled off due to the load input to the crash box at the time of a vehicle collision.

According to the vehicle load absorbing structure of claim 6, in the vehicle load absorbing structure according to claim 4 or 5, the crash box includes a reinforcing portion that extends from at least one of the bonded portions of the body portions toward the bonded portions of a second body portion of the body portions or toward the opposite side of the bonded portions of the second body portion, the reinforcing portion reinforcing a rigidity against deformation of first bonded portions in a direction in which the first bonded portions are peeled off from second bonded portions.

In the vehicle load absorbing structure according to claim 6, the reinforcing portion extends from at least one of the bonded portions of the body portions toward the second bonded portion or toward the opposite side of the second bonded portion. By providing the reinforcing portion on the bonded portions, the rigidity of the bonded portions is reinforced, and the deformation of the bonded portion of the first body portion in the direction away from the bonded portion of the second body portion is suppressed.

According to the vehicle load absorbing structure of claim 7, in the vehicle load absorbing structure according to any one of claim 4 or 6, each of the body portions includes a pair of leg plate portions each extending in the vehicle front-rear direction and constituting a portion of the body portion in a vehicle width direction, and facing portions extending from front ends of the leg plate portions in the vehicle front-rear direction outward in the vehicle width direction and disposed rearward of a rear surface of the bumper reinforcement in the vehicle front-rear direction, angles between portions of the facing portions and the leg plate portions being 90 degrees or less as viewed in the vehicle up-down direction. The vehicle load absorbing structure includes a load transmitting member that is in contact with the rear surface of the bumper reinforcement in the vehicle front-rear direction in a state in which a front surface of the load transmitting member in the vehicle front-rear direction faces the rear surface of the bumper reinforcement in the vehicle front-rear direction and that is in contact with a front surface of the facing portion in the vehicle front-rear direction in a state in which a rear surface of the load transmitting member in the vehicle front-rear direction faces the front surface of the facing portion in the vehicle front-rear direction, the load transmitting member configured to transmit the load from a front of the vehicle that is transmitted via the bumper reinforcement to the facing portion.

In the vehicle load absorbing structure according to claim 7, each of the body portions of the crash box has a pair of leg plate portions. These leg plate portions extend in the vehicle front-rear direction and constitute a part of the body portion in the vehicle width direction. Facing portions are provided at the front ends of the leg plate portions in the vehicle front-rear direction. The facing portions extend from the front ends of the leg plate portions in the vehicle front-rear direction toward the outside in the vehicle width direction, and is disposed rearward of the rear surface of the bumper reinforcement in the vehicle front-rear direction.

Load transmitting members are disposed between the rear surface of the bumper reinforcement in the vehicle front-rear direction and the facing portions of the crash box. The front surfaces of the load transmitting members in the vehicle front-rear direction are in contact with the rear surface of the bumper reinforcement in the vehicle front-rear direction while facing the rear surface of the bumper reinforcement in the vehicle front-rear direction. On the other hand, the rear surfaces of the load transmitting members in the vehicle front-rear direction are in contact with the front surfaces of facing portions of the crash box in the vehicle front-rear direction while facing the front surfaces of the facing portions in the vehicle front-rear direction. Therefore, the load input to the bumper reinforcement from the front of the vehicle at the time of a frontal collision of the vehicle is input to the facing portions of the crash box via the load transmission members.

Here, the facing portions of the crash box as viewed from the vehicle up-down direction has a portion where the angles between the facing portions and the leg plate portions of the crash box are 90 degrees or less. Therefore, the inclination between the penetrating direction of the crash box and the direction of the load transmitted from the load transmitting members to the crash box becomes small (or the inclination therebetween is eliminated).

As described above, the load absorbing member according to claim 1 can suppress the bonded portions of the body portions from being peeled off by the load input to the load absorbing member at the time of a vehicle collision. Thus, the deformation of the body portion due to the load can be stabilized.

Further, in the load absorbing member according to claim 2, the rotation moment acting on the extending portion of each body portion causes the bonded portions of the body portions to be in tight contact with each other. Thus, it is possible to effectively suppress the peeling of the bonded portions due to the load input to the load absorbing member at the time of a vehicle collision.

Further, in the load absorbing member according to claim 3, the rigidity of the bonded portions of the first body portion is reinforced by the reinforcing portion, and the deformation of the bonded portions of the first body portion in the direction away from the bonded portions of the second body portion is suppressed. Thus, it is possible to suppress peeling of the bonded portions.

Further, in the vehicle load absorbing structure according to claim 4, it is possible to suppress the bonded portions of the body portions of the crash box from being peeled off from each other by the load input to the crash box at the time of a vehicle collision. Thus, the deformation of the body portions due to the load can be stabilized.

Further, in the vehicle load absorbing structure according to claim 5, the rotation moment acting on the extending portion of each of the body portions causes the bonded portions of the body portions to be in tight contact with each other. Thus, it is possible to effectively suppress the peeling of the bonded portions due to the load input to the crash box at the time of a vehicle collision.

Further, in the vehicle load absorbing structure according to claim 6, the rigidity of the bonded portions is reinforced by the reinforcing portion, and the deformation of the bonded portions of the first body portion in the direction away from the bonded portions of the second body portion is suppressed. Thus, it is possible to suppress peeling of the bonded portions.

Further, in the vehicle load absorbing structure according to claim 7, the inclination between the penetrating direction of the crash box and the direction of the load transmitted from the load transmitting members to the crash box becomes small (or the inclination therebetween is eliminated). Therefore, the deformation of the crash box due to the load transmitted to the crash box can be controlled, and the crash box can be deformed so as to be compressed in the penetrating direction of the crash box.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, embodiments of the present disclosure will be described with reference to FIGS. 1 to 6. In the drawings, an arrow FR indicates the front side in a front-rear direction of a vehicle to which a crash box 10 (vehicle load absorbing structure) serving as a load absorbing member is applied, an arrow LH indicates the left side in a vehicle right-left direction, and an arrow UP indicates the upper side in a vehicle up-down direction. In each of the following embodiments, the crash box 10 disposed on the right side of the vehicle will be described. However, as an example, a symmetrical configuration of the crash box 10 described below can be applied to the crash box 10 disposed on the left side of the vehicle.

Configuration of First Embodiment

Figure 1:
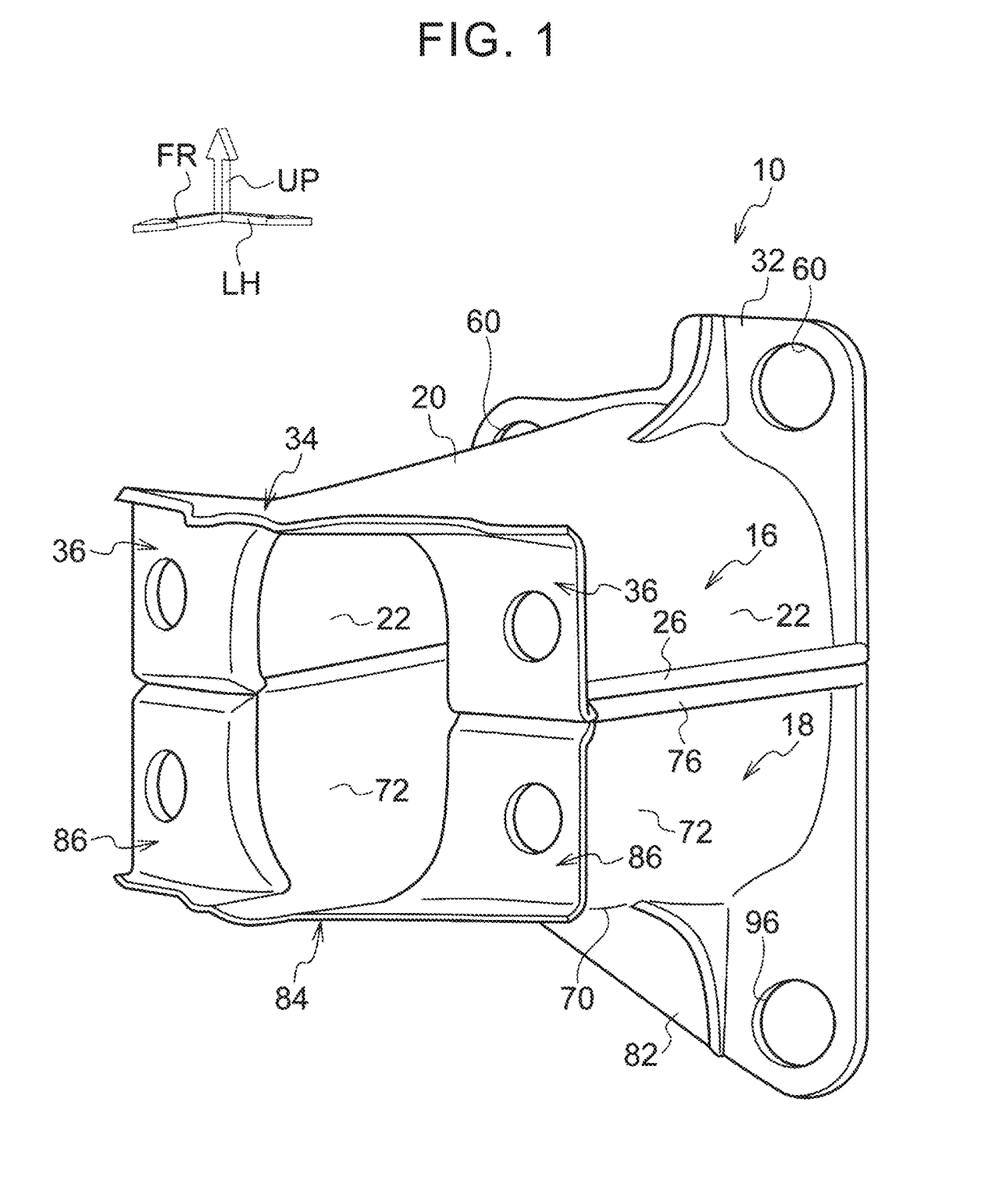
FIG. 1 is a perspective view of a load absorbing member according to a first embodiment as viewed from the front left side of a vehicle.
Figure 2:
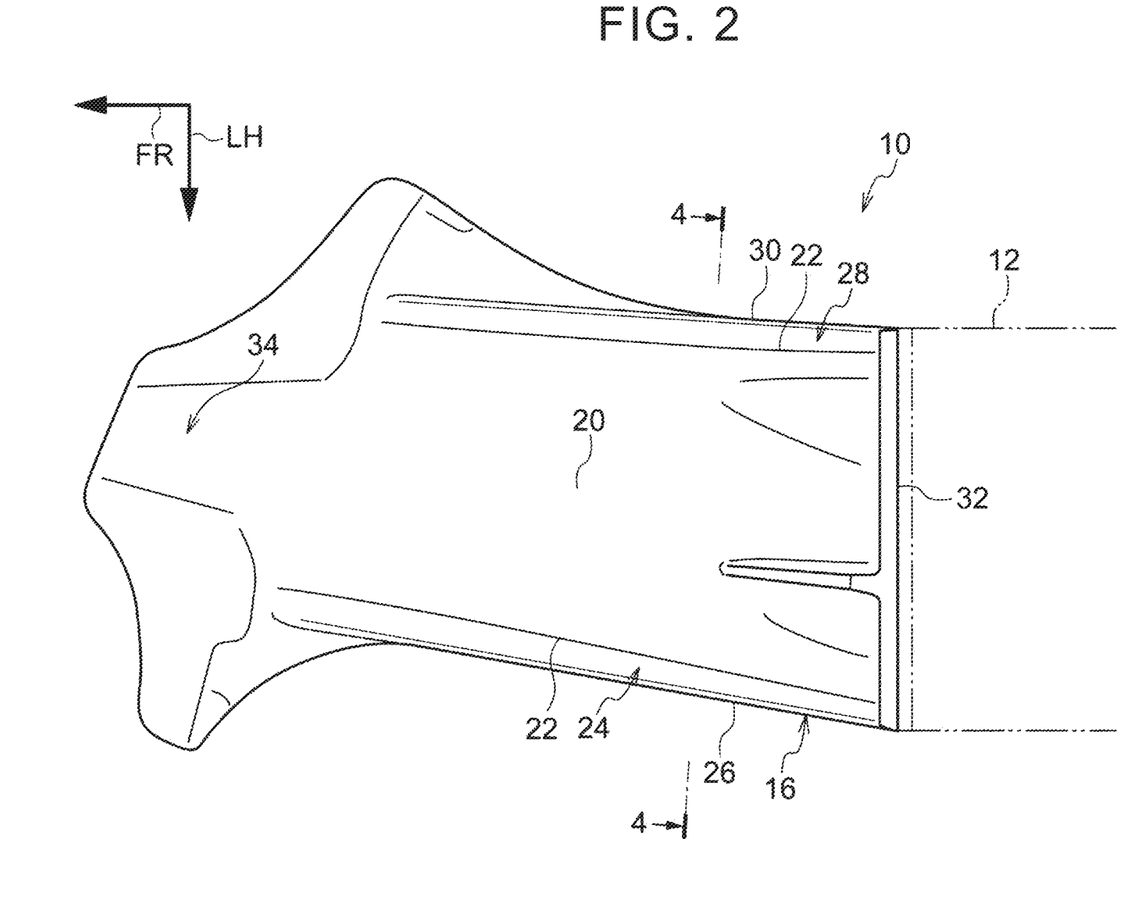
FIG. 2 is a plan view of the load absorbing member according to the first embodiment (a vehicle load absorbing structure according to the first embodiment) as viewed from the upper side of the vehicle.
Figure 3:
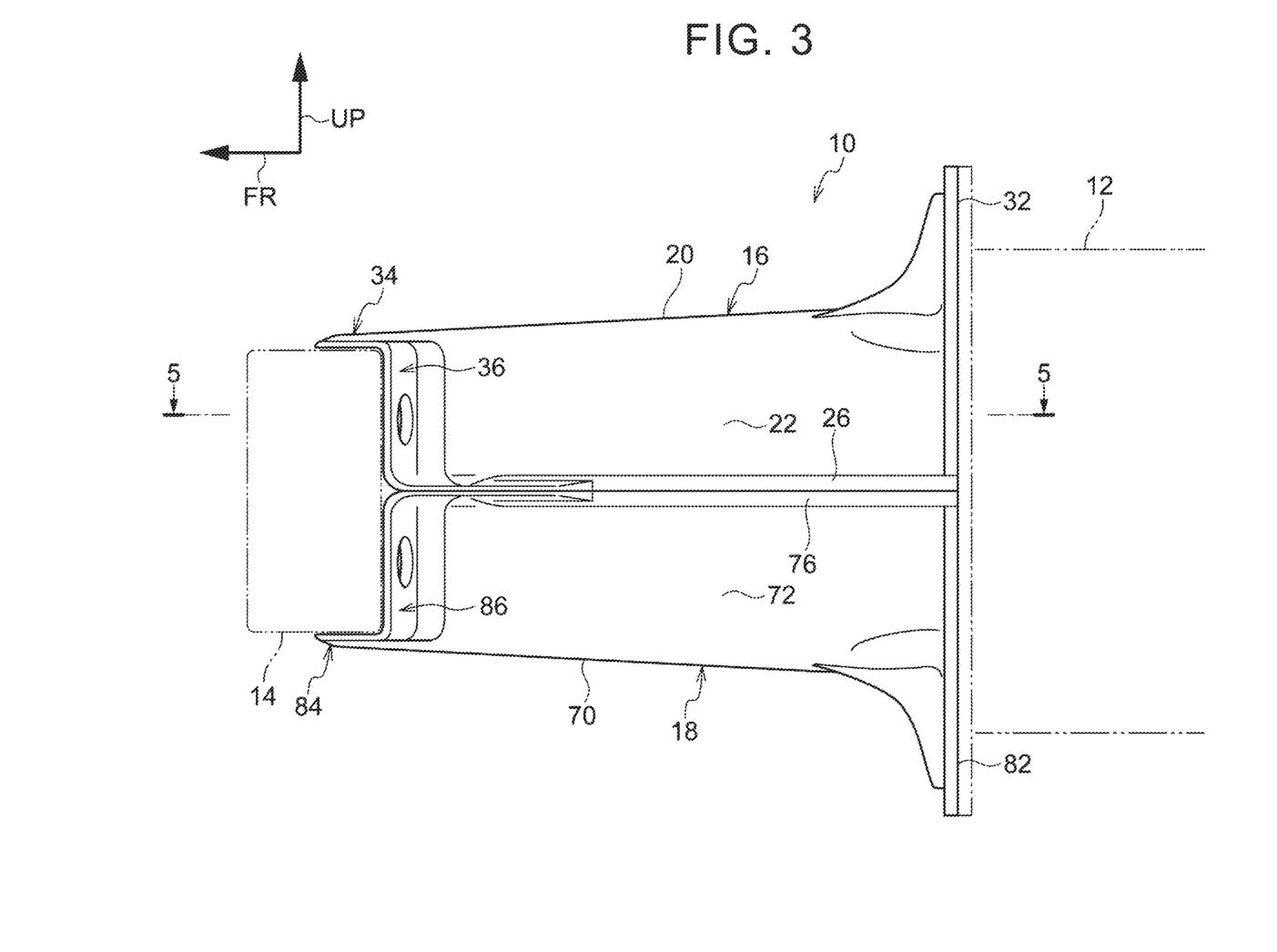
FIG. 3 is a side view of the load absorbing member according to the first embodiment (the vehicle load absorbing structure according to the first embodiment) as viewed from the left side of the vehicle.

As appropriately shown in FIGS. 1 to 5, the crash box 10 according to a first embodiment has a tubular shape that generally extends through the vehicle front-rear direction, and is disposed in front of a front side member 12 in the vehicle front-rear direction (see FIGS. 2 and 3). The front side member 12 is disposed on the right side of the vehicle and constitutes a support member as a skeletal member (structural member) of the vehicle. A bumper reinforcement 14 of the vehicle is disposed in front of the crash box 10 in the vehicle front-rear direction.

As shown in FIGS. 1 and 3, the crash box 10 includes a first body portion 16 and a second body portion 18. Each of the first body portion 16 and the second body portion 18 is formed by, for example, press-forming a plate material made of a fiber reinforced resin material in which a synthetic resin material such as epoxy resin or phenol resin is combined with fiber such as glass fiber or carbon fiber to improve the strength.

The first body portion 16 includes a first body upper portion 20, a pair of first leg plate portions 22 serving as leg plate portions, a first left side bonded portion 24 serving as a bonded portion, a first left side reinforcing portion 26 serving as a reinforcing portion, a first right side bonded portion 28 serving as a bonded portion, a first right side reinforcing portion 30 serving as a reinforcing portion, a first rear side connecting portion 32, and a first extending portion 34 serving as an extending portion.

The first body upper portion 20 has a substantially plate shape, and is curved around an axis below the first body upper portion 20 in the vehicle up-down direction, which indicates one side in the thickness direction of the first body upper portion 20, with the vehicle front-rear direction substantially serving as the axial direction. Thus, the sectional shape of the first body upper portion 20 obtained by cutting the first body upper portion 20 in the direction orthogonal to the vehicle front-rear direction is a substantially inverted U-shape that opens toward the lower side of the vehicle.

One of the first leg plate portions 22 extends from the left end of the first body upper portion 20 in the vehicle right-left direction toward the lower side of the vehicle, and the other first leg plate portion 22 extends from the right end of the first body upper portion 20 in the vehicle right-left direction toward the lower side of the vehicle. These first leg plate portions 22 have plate shapes, and the thickness direction of the first leg plate portions 22 is substantially the vehicle right-left direction.

Figure 5:
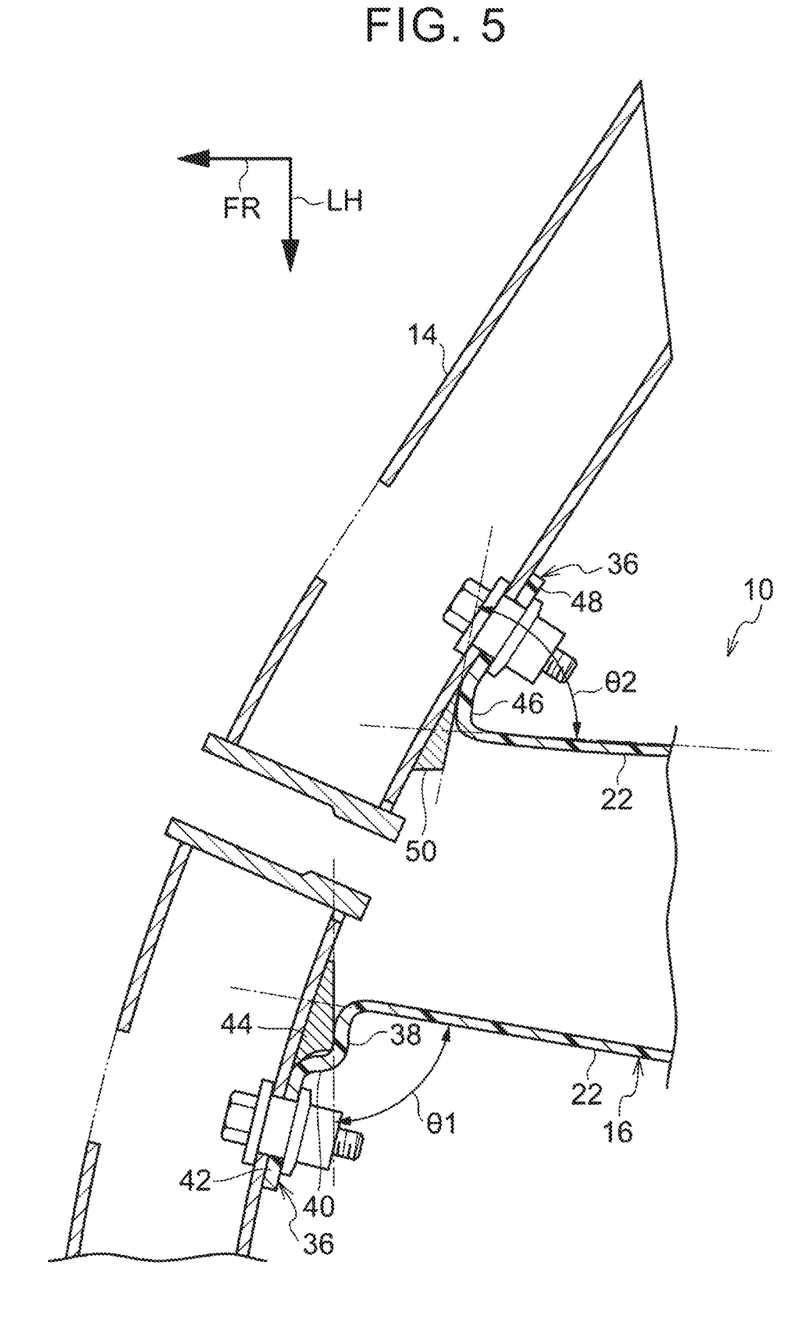
FIG. 5 is a sectional view taken along line 5-5 of FIG. 3.

First front side connecting portions 36 serving as facing portions are provided at the front end of each of the first leg plate portions 22 in the vehicle front-rear direction. Specifically, as shown in FIG. 5, the first front side connecting portion 36 on the left side in the vehicle right-left direction includes a right side portion 38, a center portion 40, and a left side portion 42. The right side portion 38 of the first front side connecting portion 36 on the left side in the vehicle right-left direction extends from the front end of the first leg plate portion 22 in the vehicle front-rear direction toward the left side of the vehicle, and the right side portion 38 is spaced apart in the vehicle front-rear direction from the rear surface of the bumper reinforcement 14 in the vehicle front-rear direction.

Here, an angle θ1 between the direction in which the first leg plate portion 22 on the left side in the vehicle right-left direction extends from its front end toward its rear end in the vehicle front-rear direction, that is, the longitudinal direction of the first leg plate portion 22 on the left side in the vehicle right-left direction, and the direction in which the right side portion 38 extends from the front end of the first leg plate portion 22 in the vehicle front-rear direction on the left side in the vehicle right-left direction is 90 degrees or less. The center portion 40 of the first front side connecting portion 36 on the left side in the vehicle right-left direction extends from the left end of the right side portion 38 in the vehicle right-left direction toward the front side of the vehicle. The left side portion 42 of the first front side connecting portion 36 on the left side in the vehicle right-left direction extends from the front end of the center portion 40 in the vehicle front-rear direction toward the left side of the vehicle along the rear surface of the bumper reinforcement 14 in the vehicle front-rear direction.

Therefore, in the present embodiment, the angle between the left side portion 42 of the first front side connecting portion 36 on the left side in the vehicle right-left direction and the first leg plate portion 22 on the left side in the vehicle right-left direction is larger than the angle θ1 between the right side portion 38 of the first front side connecting portion 36 on the left side in the vehicle right-left direction and the first leg plate portion 22 on the left side in the vehicle right-left direction. A fastening member such as a bolt is inserted through the left side portion 42 of the first front side connecting portion 36 on the left side in the vehicle right-left direction, and the fastening member fastens and fixes the first front side connecting portion 36 on the left side in the vehicle right-left direction to the bumper reinforcement 14.

Here, a left side spacer 44 serving as a load transmitting member is provided between the right side portion 38 of the first front side connecting portion 36 on the left side in the vehicle right-left direction and the bumper reinforcement 14. The left side spacer 44 has a block shape, and the height direction of the left side spacer 44 is substantially the vehicle up-down direction. The left side spacer 44 has a substantially triangular shape that narrows toward the right side of the vehicle in a plan view. The front surface of the left side spacer 44 in the vehicle front-rear direction is in contact with the rear surface of the bumper reinforcement 14 in the vehicle front-rear direction, and the rear surface of the left side spacer 44 in the vehicle front-rear direction is in contact with the front surface of the right side portion 38 in the vehicle front-rear direction of the first front side connecting portion 36 on the left side in the vehicle right-left direction.

On the other hand, the first front side connecting portion 36 on the right side in the vehicle right-left direction includes a left side portion 46 and a right side portion 48. The left side portion 46 of the first front side connecting portion 36 on the right side in the vehicle right-left direction extends from the front end of the first leg plate portion 22 in the vehicle front-rear direction toward the right side of the vehicle, and is spaced apart in the vehicle front-rear direction from the rear surface of the bumper reinforcement 14 in the vehicle front-rear direction.

Here, an angle θ2 between the direction in which the first leg plate portion 22 on the right side in the vehicle right-left direction extends from its front end toward its rear end in the vehicle front-rear direction, that is, the longitudinal direction of the first leg plate portion 22 on the right side in the vehicle right-left direction, and the direction in which the left side portion 46 extends from the front end of the first leg plate portion 22 in the vehicle front-rear direction on the right side in the vehicle right-left direction is 80 degrees or more and 90 degrees or less. The right side portion 48 of the first front side connecting portion 36 on the right side in the vehicle right-left direction extends from the right end of the left side portion 46 in the vehicle right-left direction toward the right side of the vehicle along the rear surface of the bumper reinforcement 14 in the vehicle front-rear direction. A fastening member such as a bolt is inserted through the right side portion 48 of the first front side connecting portion 36 on the right side in the vehicle right-left direction, and the fastening member fastens and fixes the first front side connecting portion 36 on the right side in the vehicle right-left direction to the bumper reinforcement 14.

Figure 4:
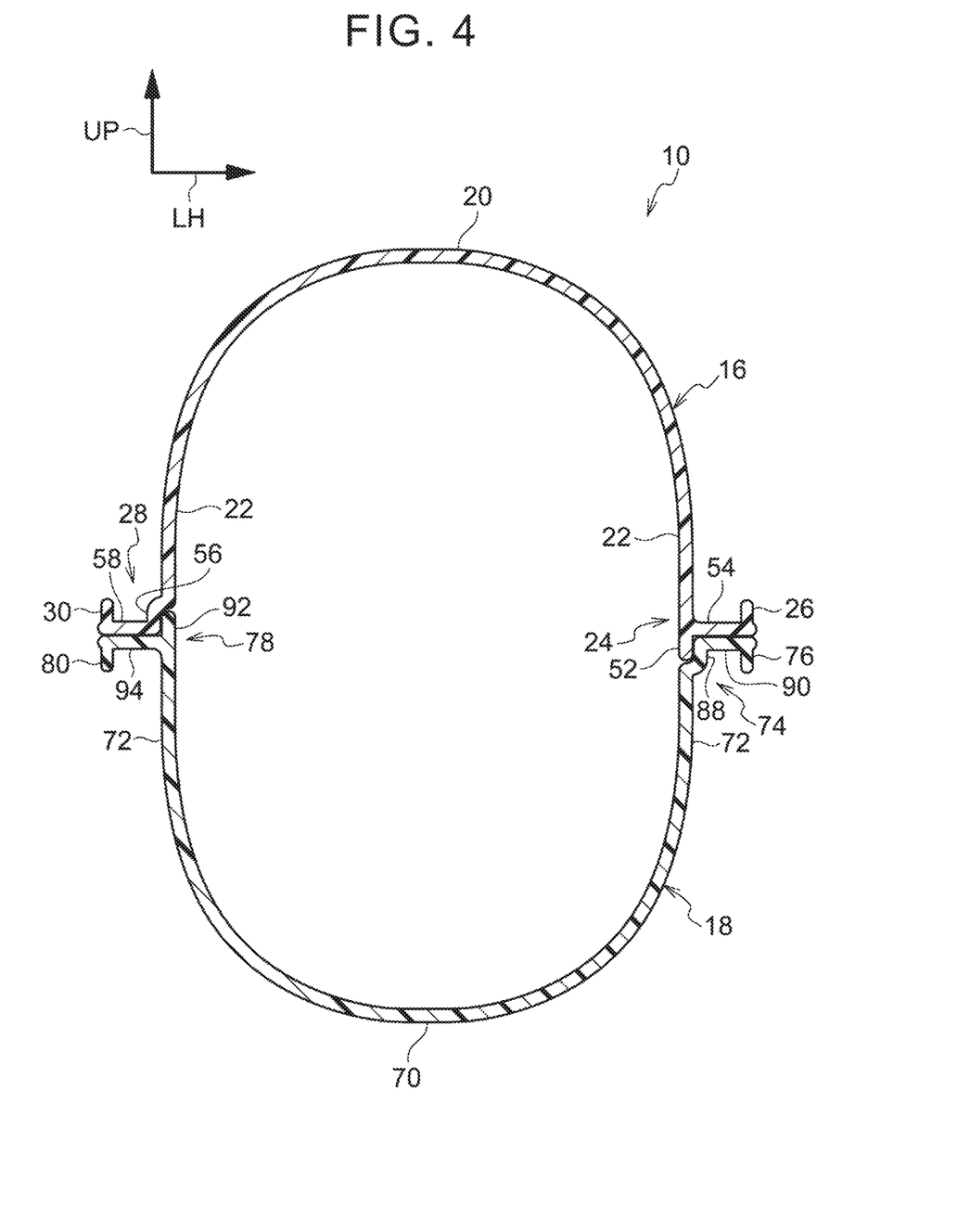
FIG. 4 is a sectional view taken along line 4-4 of FIG. 2.

Here, a right side spacer 50 serving as a load transmitting member is provided between the left side portion 46 of the first front side connecting portion 36 on the right side in the vehicle right-left direction and the rear surface of the bumper reinforcement 14 in the vehicle front-rear direction. The right side spacer 50 has a block shape, and the height direction of the right side spacer 50 is substantially the vehicle up-down direction. The right side spacer 50 has a substantially triangular shape that narrows toward the right side of the vehicle in a plan view. The front surface of the right side spacer 50 in the vehicle front-rear direction is in contact with the rear surface of the bumper reinforcement 14 in the vehicle front-rear direction, and the rear surface of the right side spacer 50 in the vehicle front-rear direction is in contact with the front surface of the left side portion 46 in the vehicle front-rear direction of the first front side connecting portion 36 on the right side in the vehicle right-left direction. On the other hand, the first left side bonded portion 24 described above is provided on the first leg plate portion 22 on the left side in the vehicle right-left direction and the first front side connecting portion 36 on the left side in the vehicle right-left direction. As shown in FIG. 4, the first left side bonded portion 24 includes a first left side vertical piece 52. The first left side vertical piece 52 has a plate shape, and the width direction of the first left side vertical piece 52 is substantially the vehicle up-down direction. The first left side vertical piece 52 extends toward the lower side of the vehicle from the lower end of the first leg plate portion 22 in the vehicle up-down direction on the left side in the vehicle right-left direction and from the lower end of the first front side connecting portion 36 in the vehicle up-down direction on the left side in the vehicle right-left direction.

Further, the first left side bonded portion 24 includes a first left side lateral piece 54. The first left side lateral piece 54 has a plate shape, and the thickness direction of the first left side lateral piece 54 is substantially the vehicle up-down direction. On the side of the first leg plate portion 22 on the left side in the vehicle right-left direction, the first left side lateral piece 54 extends from the lower end of the first leg plate portion 22 in the vehicle up-down direction on the left side in the vehicle right-left direction toward the left side of the vehicle. On the side of the first front side connecting portion 36 on the left side in the vehicle right-left direction, the first left side lateral piece 54 extends from the lower end of the first front side connecting portion 36 in the vehicle up-down direction on the left side in the vehicle right-left direction toward the rear side of the vehicle.

The first left side reinforcing portion 26 is provided on the opposite side of the first left side lateral piece 54 from the first leg plate portion 22 and on the opposite side of the first left side lateral piece 54 from the first front side connecting portion 36. The first left side reinforcing portion 26 has a plate shape, and the width direction of the first left side reinforcing portion 26 is substantially the vehicle up-down direction. The first left side reinforcing portion 26 extends toward the upper side of the vehicle from an end of the first left side lateral piece 54 on the opposite side of the first leg plate portion 22 and from the end of the first left side lateral piece 54 on the opposite side of the first front side connecting portion 36.

On the other hand, the first right side bonded portion 28 is provided on the first leg plate portion 22 on the right side in the vehicle right-left direction and the first front side connecting portion 36 on the right side in the vehicle right-left direction. The first right side bonded portion 28 includes a first right side vertical piece 56. The first right side vertical piece 56 has a plate shape, and the width direction of the first right side vertical piece 56 is substantially the vehicle up-down direction.

On the side of the first leg plate portion 22 on the right side in the vehicle right-left direction, the upper portion of the first right side vertical piece 56 in the vehicle up-down direction is disposed rightward in the vehicle right-left direction of the lower end of the first leg plate portion 22 in the vehicle up-down direction on the right side in the vehicle right-left direction, and the first right side vertical piece 56 is provided continuously from the first leg plate portion 22 on the right side in the vehicle right-left direction. On the side of the first front side connecting portion 36 on the right side in the vehicle right-left direction, the upper portion of the first right side vertical piece 56 in the vehicle up-down direction is disposed rearward in the vehicle front-rear direction of the lower end of the first front side connecting portion 36 in the vehicle up-down direction on the right side in the vehicle right-left direction, and the first right side vertical piece 56 is provided continuously from the first front side connecting portion 36 on the right side in the vehicle right-left direction.

A first right side lateral piece 58 is provided below the first right side vertical piece 56 in the vehicle up-down direction. The first right side lateral piece 58 has a plate shape, and the thickness direction of the first right side lateral piece 58 is substantially the vehicle up-down direction. On the side of the first leg plate portion 22 on the right side in the vehicle right-left direction, the first right side lateral piece 58 extends from the lower end of the first right side vertical piece 56 in the vehicle up-down direction toward the right side of the vehicle, and on the side of the first front side connecting portion 36 on the right side in the vehicle right-left direction, the first right side lateral piece 58 extends from the lower end of the first right side vertical piece 56 in the vehicle up-down direction toward the rear side of the vehicle.

The first right side reinforcing portion 30 is provided on the opposite side of the first right side lateral piece 58 from the first leg plate portion 22 and on the opposite side of the first right side lateral piece 58 from the first front side connecting portion 36. The first right side reinforcing portion 30 has a plate shape, and the width direction of the first right side reinforcing portion 30 is substantially the vehicle up-down direction. The first right side reinforcing portion 30 extends toward the upper side of the vehicle from an end of the first right side lateral piece 58 on the opposite side of the first leg plate portion 22 and from the end of the first right side lateral piece 58 on the opposite side of the first front side connecting portion 36.

The first rear side connecting portion 32 is provided rearward of the first body portion 16 having the above configuration in the vehicle front-rear direction. The first rear side connecting portion 32 has a plate shape, and the thickness direction of the first rear side connecting portion 32 is substantially the vehicle front-rear direction. The first rear side connecting portion 32 extends from the rear end of the first body portion 16 in the vehicle front-rear direction toward the upper side of the first body portion 16 in the vehicle up-down direction and toward the outside of the first body portion 16 in the vehicle right-left direction. The first rear side connecting portion 32 is provided with a first rear side hole 60 extending through the first rear side connecting portion 32 in the thickness direction. A fastening member such as a bolt is inserted through the first rear side hole 60, and the fastening member fastens and fixes the first rear side connecting portion 32 to the front side member 12 disposed rearward of the crash box 10 in the vehicle front-rear direction.

Further, as shown in FIGS. 1, 2, and 3, the first body portion 16 includes the first extending portion 34. The first extending portion 34 extends toward the front side of the vehicle from the first body upper portion 20 of the first body portion 16 and from the upper ends of the first front side connecting portions 36 in the vehicle up-down direction on both right and left sides in the vehicle right-left direction. The first extending portion 34 is disposed so as to face the upper surface of the bumper reinforcement 14 in the vehicle up-down direction in the vehicle up-down direction. The width direction of the first extending portion 34 is substantially the vehicle right-left direction. The width dimension of the first extending portion 34 is reduced toward the front side of the vehicle. Thus, the first extending portion 34 has a substantially trapezoidal shape in plan view. Both side portions of the first extending portion 34 in the width direction are substantially flat.

On the other hand, as shown in FIGS. 1, 2, and 4, the second body portion 18 includes a second body lower portion 70, a pair of second leg plate portions 72 serving as leg plate portions, a second left side bonded portion 74 serving as a bonded portion, a second left side reinforcing portion 76 serving as a reinforcing portion, a second right side bonded portion 78 serving as a bonded portion, a second right side reinforcing portion 80 serving as a reinforcing portion, a second rear side connecting portion 82, and a second extending portion 84 serving as an extending portion.

The second body lower portion 70 has a substantially plate shape, and is curved around an axis above the second body lower portion 70 in the vehicle up-down direction, which indicates the other side in the thickness direction of the second body lower portion 70, with the vehicle front-rear direction substantially serving as the axial direction. Thus, the sectional shape of the second body lower portion 70 obtained by cutting the second body lower portion 70 in the direction orthogonal to the vehicle front-rear direction is substantially a U-shape that opens toward the upper side of the vehicle.

One of the second leg plate portions 72 extends from the left end of the second body lower portion 70 in the vehicle right-left direction toward the upper side of the vehicle, and the other second leg plate portion 72 extends from the right end of the second body lower portion 70 in the vehicle right-left direction toward the upper side of the vehicle. These second leg plate portions 72 have plate shapes, and the thickness direction of the second leg plate portions 72 is substantially the vehicle right-left direction.

Second front side connecting portions 86 serving as facing portions are provided at the front end of each of the second leg plate portions 72 in the vehicle front-rear direction. The second front side connecting portion 86 on the left side in the vehicle right-left direction extends from the front end of the second leg plate portion 72 on the left side in the vehicle right-left direction toward the left side of the vehicle. Although detailed description based on the drawings is omitted, the second front side connecting portion 86 on the left side in the vehicle right-left direction includes a right side portion, a center portion, and a left side portion each corresponding to the right side portion 38, the center portion 40, and the left side portion 42 of the first front side connecting portion 36 on the left side in the vehicle right-left direction of the first body portion 16 described above. Further, the left side spacer 44 is provided between the right side portion of the second front side connecting portion 86 on the left side in the vehicle right-left direction and the bumper reinforcement 14, and the rear surface of the left side spacer 44 in the vehicle front-rear direction is in contact with the front surface of the right side portion in the vehicle front-rear direction of the second front side connecting portion 86.

The second front side connecting portion 86 on the right side in the vehicle right-left direction extends from the front end of the second leg plate portion 72 on the right side in the vehicle right-left direction toward the right side of the vehicle. Although detailed description based on the drawings is omitted, the second front side connecting portion 86 on the right side in the vehicle right-left direction includes a left side portion and a right side portion each corresponding to the left side portion 46 and the right side portion 48 of the first front side connecting portion 36 on the right side in the vehicle right-left direction of the first body portion 16 described above. Further, the right side spacer 50 is provided between the left side portion of the second front side connecting portion 86 on the left side in the vehicle right-left direction and the bumper reinforcement 14, and the rear surface of the right side spacer 50 in the vehicle front-rear direction is in contact with the front surface of the left side portion in the vehicle front-rear direction of the second front side connecting portion 86.

The second left side bonded portion 74 is provided on the second leg plate portion 72 on the left side in the vehicle right-left direction and the second front side connecting portion 86 on the left side in the vehicle right-left direction. As shown in FIG. 4, the second left side bonded portion 74 includes a second left side vertical piece 88. The second left side vertical piece 88 has a plate shape, and the width direction of the second left side vertical piece 88 is substantially the vehicle up-down direction.

On the side of the second leg plate portion 72 on the left side in the vehicle right-left direction, the lower portion of the second left side vertical piece 88 in the vehicle up-down direction is disposed leftward in the vehicle right-left direction of the upper end of the second leg plate portion 72 in the vehicle up-down direction on the left side in the vehicle right-left direction. The second left side vertical piece 88 on the second leg plate portion 72 side is provided continuously from the second leg plate portion 72 on the left side in the vehicle right-left direction, and the upper portion of the second left side vertical piece 88 in the vehicle up-down direction faces the first left side vertical piece 52 of the first left side bonded portion 24 on the first leg plate portion 22 side of the first body portion 16 from the left in the vehicle right-left direction.

On the second front side connecting portion 86 side on the left side in the vehicle right-rear direction, the lower portion of the second left side vertical piece 88 in the vehicle up-down direction is disposed rearward in the vehicle front-rear direction of the upper end of the second front side connecting portion 86 in the vehicle up-down direction on the left side in the vehicle right-left direction. The second left side vertical piece 88 on the second front side connecting portion 86 side is provided continuously from the second front side connecting portion 86 on the left side in the vehicle right-left direction, and the upper portion of the second left side vertical piece 88 in the vehicle up-down direction faces the first left side vertical piece 52 of the first left side bonded portion 24 on the first leg plate portion 22 side of the first body portion 16 from the rear in the vehicle front-rear direction.

A second left side lateral piece 90 is provided above the second left side vertical piece 88 in the vehicle up-down direction. The second left side lateral piece 90 has a plate shape, and the thickness direction of the second left side lateral piece 90 is substantially the vehicle up-down direction. On the side of the second leg plate portion 72 on the left side in the vehicle right-left direction, the second left side lateral piece 90 extends from the upper end of the second left side vertical piece 88 in the vehicle up-down direction toward the left side of the vehicle, and on the side of the second front side connecting portion 86 on the left side in the vehicle right-left direction, the second left side lateral piece 90 extends from the upper end of the second left side vertical piece 88 in the vehicle up-down direction toward the rear side of the vehicle. The second left side vertical piece 88 and the first left side lateral piece 54 of the first left side bonded portion 24 of the first body portion 16 face each other in the vehicle up-down direction and are integrally bonded to each other with an adhesive.

The second left side reinforcing portion 76 is provided on the opposite side of the second left side lateral piece 90 from the second leg plate portion 72 and on the opposite side of the second left side lateral piece 90 from the second front side connecting portion 86. The second left side reinforcing portion 76 has a plate shape, and the width direction of the second left side reinforcing portion 76 is substantially the vehicle up-down direction. The second left side reinforcing portion 76 extends toward the lower side of the vehicle from an end of the second left side lateral piece 90 on the opposite side of the second leg plate portion 72 and from the end of the second left side lateral piece 90 on the opposite side of the second front side connecting portion 86.

On the other hand, the second right side bonded portion 78 is provided on the second leg plate portion 72 on the right side in the vehicle right-left direction and the second front side connecting portion 86 on the right side in the vehicle right-left direction. As shown in FIG. 4, the second right side bonded portion 78 includes a second right side vertical piece 92. The second right side vertical piece 92 has a plate shape, and the width direction of the second right side vertical piece 92 is substantially the vehicle up-down direction. The second right side vertical piece 92 extends toward the upper side of the vehicle from the upper end of the second leg plate portion 72 in the vehicle up-down direction on the right side in the vehicle right-left direction and from the upper end of the second front side connecting portion 86 in the vehicle up-down direction on the right side in the vehicle right-left direction. The upper end of the second right side vertical piece 92 in the vehicle up-down direction faces the lower end of the first leg plate portion 22 in the vehicle up-down direction on the right side of the first body portion 16 in the vehicle right-left direction.

Further, the second right side bonded portion 78 includes a second right side lateral piece 94. The second right side lateral piece 94 has a plate shape, and the thickness direction of the second right side lateral piece 94 is substantially the vehicle up-down direction. On the side of the second leg plate portion 72 on the right side in the vehicle right-left direction, the second right side lateral piece 94 extends from the upper end of the second leg plate portion 72 in the vehicle up-down direction on the right side in the vehicle right-left direction toward the right side of the vehicle. On the side of the second front side connecting portion 86 on the right side in the vehicle right-left direction, the second right side lateral piece 94 extends from the upper end of the second front side connecting portion 86 in the vehicle up-down direction on the right side in the vehicle right-left direction toward the rear side of the vehicle. The second right side vertical piece 92 and the first right side lateral piece 58 of the first right side bonded portion 28 of the first body portion 16 face each other in the vehicle up-down direction and are integrally bonded to each other with an adhesive.

The second right side reinforcing portion 80 is provided on the opposite side of the second right side lateral piece 94 from the second leg plate portion 72 and on the opposite side of the second right side lateral piece 94 from the second front side connecting portion 86. The second right side reinforcing portion 80 has a plate shape, and the width direction of the second right side reinforcing portion 80 is substantially the vehicle up-down direction. The second right side reinforcing portion 80 extends toward the lower side of the vehicle from an end of the second right side lateral piece 94 on the opposite side of the second leg plate portion 72 and from the end of the second right side lateral piece 94 on the opposite side of the second front side connecting portion 86.

As shown in FIG. 1, the second rear side connecting portion 82 is provided rearward of the second body portion 18 having the above configuration in the vehicle front-rear direction. The second rear side connecting portion 82 has a plate shape, and the thickness direction of the second rear side connecting portion 82 is substantially the vehicle front-rear direction. The second rear side connecting portion 82 extends from the rear end of the second body portion 18 in the vehicle front-rear direction toward the lower side of the second body portion 18 in the vehicle up-down direction and toward the outside of the second body portion 18 in the vehicle right-left direction. The second rear side connecting portion 82 is provided with a second rear side hole 96 extending through the second rear side connecting portion 82 in the thickness direction. A fastening member such as a bolt is inserted through the second rear side hole 96, and the fastening member fastens and fixes the second rear side connecting portion 82 to the front side member 12 disposed rearward of the crash box 10 in the vehicle front-rear direction.

Further, as shown in FIGS. 1 and 3, the second body portion 18 includes the second extending portion 84. The second extending portion 84 extends toward the front side of the vehicle from the second body lower portion 70 of the second body portion 18 and from the lower ends of the second front side connecting portions 86 in the vehicle up-down direction on both right and left sides in the vehicle right-left direction. The second extending portion 84 is disposed so as to face the lower surface of the bumper reinforcement 14 in the vehicle up-down direction in the vehicle up-down direction. The width direction of the second extending portion 84 is substantially the vehicle right-left direction. The width dimension of the second extending portion 84 is reduced toward the front side of the vehicle. Thus, the second extending portion 84 has a substantially trapezoidal shape in plan view. Both side portions of the second extending portion 84 in the width direction are substantially flat.

Operations and Effects of First Embodiment

When a vehicle to which the crash box 10 having the above-described configuration is applied collides with an obstacle in front of the vehicle, the load from the obstacle is input to the bumper reinforcement 14. The load input to the bumper reinforcement 14 is transmitted to the crash box 10 as an axial force from the front of the vehicle. The front side member 12 serving as a skeletal member (structural member) of the vehicle body of the vehicle is disposed rearward of the crash box 10 in the vehicle front-rear direction, and the crash box 10 is fixed to the front side member 12. Therefore, the crash box 10 to which the above load is transmitted is supported from the rear by the front side member 12 in the vehicle front-rear direction.

When the load transmitted from the bumper reinforcement 14 to the crash box 10 as an axial force from the front of the vehicle exceeds the mechanical strength of the crash box 10 against the compressive load in the vehicle front-rear direction, the crash box 10 is deformed (crushed) such that the front portion of the crash box 10 in the vehicle front-rear direction moves toward the rear portion thereof in the vehicle front-rear direction. At least a part of the load transmitted to the crash box 10 from the front of the vehicle is used for such a deformation of the crash box 10. Thereby, at least a part of the load transmitted to the crash box 10 from the front of the vehicle can be absorbed, and the load that is transmitted from the crash box 10 to the front side member 12 can be reduced.

Above the bumper reinforcement 14 in the vehicle up-down direction, the first extending portion 34 extends toward the front of the vehicle from the front end of the first body upper portion 20 in the vehicle front-rear direction of the first body portion 16 of the crash box 10 and from the upper ends of the first front side connecting portions 36 in the vehicle up-down direction. The first body portion 16 including the first front side connecting portions 36 faces the bumper reinforcement 14 in the vehicle front-rear direction at a position below the first extending portion 34 in the vehicle up-down direction. Therefore, the input position of the load from the bumper reinforcement 14 in the first body portion 16 is a position below the first extending portion 34 in the vehicle up-down direction.

As a result, when the load is transmitted from the bumper reinforcement 14 to the first body portion 16, the first extending portion 34 acts as an arm for a rotation moment and a rotation moment that rotates the front portion of the first extending portion 34 in the vehicle front-rear direction toward the lower side of the vehicle is generated in the first extending portion 34. Thus, it is possible to suppress the first body portion 16 from moving toward the upper side of the vehicle due to the load transmitted from the bumper reinforcement 14 to the first body portion 16.

On the other hand, below the bumper reinforcement 14 in the vehicle up-down direction, the second extending portion 84 extends toward the front of the vehicle from the front end of the second body lower portion 70 in the vehicle front-rear direction of the second body portion 18 of the crash box 10 and from the lower ends of the second front side connecting portions 86 in the vehicle up-down direction. The second body portion 18 including the second front side connecting portions 86 faces the bumper reinforcement 14 in the vehicle front-rear direction at a position above the second extending portion 84 in the vehicle up-down direction. Therefore, the input position of the load from the bumper reinforcement 14 in the second body portion 18 is a position above the second extending portion 84 in the vehicle up-down direction.

As a result, when the load is transmitted from the bumper reinforcement 14 to the second body portion 18, the second extending portion 84 acts as an arm for a rotation moment and a rotation moment that rotates the front portion of the second extending portion 84 in the vehicle front-rear direction toward the upper side of the vehicle is generated in the second extending portion 84. Thus, it is possible to suppress the second body portion 18 from moving toward the lower side of the vehicle due to the load transmitted from the bumper reinforcement 14 to the second body portion 18.

As described above, when the load is transmitted from the bumper reinforcement 14 to the crash box 10, a rotation moment toward the lower side of the vehicle is generated in the first extending portion 34 in the first body portion 16, and a rotation moment toward the upper side of the vehicle is generated in the second extending portion 84 in the second body portion 18. These rotation moments act so as to bring the first extending portion 34 and the second extending portion 84 closer to each other.

Thus, the first left side bonded portion 24 of the first body portion 16 and the second left side bonded portion 74 of the second body portion 18 are brought in tight contact with each other, and the first right side bonded portion 28 of the first body portion 16 and the second right side bonded portion 78 of the second body portion 18 are brought in tight contact with each other. Therefore, when a load is input to the first body portion 16 and the second body portion 18, it is possible to suppress the first left side bonded portion 24 of the first body portion 16 and the second left side bonded portion 74 of the second body portion 18 from being peeled off, and it is possible to suppress the first right side bonded portion 28 of the first body portion 16 and the second right side bonded portion 78 of the second body portion 18 from being peeled off.

Further, in the present embodiment, the first body portion 16 is provided with the first left side reinforcing portion 26 and the first right side reinforcing portion 30. Thereby, for example, as shown in FIG. 4, a cross-sectional shape obtained by cutting a portion composed of the first leg plate portion 22 on the left side of the first body portion 16 in the vehicle right-left direction, the first left side lateral piece 54 of the first left side bonded portion 24, and the first left side reinforcing portion 26 in the direction orthogonal to the vehicle front-rear direction has a U-shape that opens toward the upper side of the vehicle. Similarly, a cross-sectional shape obtained by cutting a portion composed of the first right side vertical piece 56 of the first right side bonded portion 28, the first right side lateral piece 58 of the first right side bonded portion 28, and the first right side reinforcing portion 30 in the direction orthogonal to the vehicle front-rear direction has a U-shape that opens toward the upper side of the vehicle.

Therefore, the configuration described above has high rigidity against a load that rotates the first left side bonded portion 24 and the first right side bonded portion 28 toward the upper side of the vehicle around an axis with the vehicle width direction serving as the axial direction. Accordingly, when the load from the front of the vehicle is input to the first body portion 16, it is possible to suppress the first left side bonded portion 24 and the first right side bonded portion 28 from deforming such that the first left side bonded portion 24 and the first right side bonded portion 28 rotate toward the upper side of the vehicle.

In the present embodiment, the second body portion 18 is provided with the second right side reinforcing portion 80 and the second left side reinforcing portion 76. Thereby, for example, as shown in FIG. 4, a cross-sectional shape obtained by cutting a portion composed of the second left side vertical piece 88 of the second left side bonded portion 74, the second left side lateral piece 90 of the second left side bonded portion 74, and the second left side reinforcing portion 76 in the direction orthogonal to the vehicle front-rear direction has an inverted U-shape that opens toward the lower side of the vehicle. Similarly, a cross-sectional shape obtained by cutting a portion composed of the second leg plate portion 72 on the right side of the second body portion 18 in the vehicle right-left direction, the second right side lateral piece 94 of the second right side bonded portion 78, and the second right side reinforcing portion 80 in the direction orthogonal to the vehicle front-rear direction has an inverted U-shape that opens toward the lower side of the vehicle.

Therefore, the configuration described above has high rigidity against the load that rotates the second left side bonded portion 74 and the second right side bonded portion 78 toward the lower side of the vehicle around an axis with the vehicle width direction serving as the axial direction. Accordingly, when the load from the front of the vehicle is input to the second body portion 18, it is possible to suppress the second left side bonded portion 74 and the second right side bonded portion 78 from deforming such that the second left side bonded portion 74 and the second right side bonded portion 78 rotate toward the lower side of the vehicle.

In this way, in the present embodiment, it is possible to suppress the first left side bonded portion 24 and the second left side bonded portion 74 from being peeled off from each other in the vicinity of the first left side bonded portion 24 and the second left side bonded portion 74, and it is possible to suppress the first right side bonded portion 28 and the second right side bonded portion 78 from being peeled off from each other in the vicinity of the first right side bonded portion 28 and the second right side bonded portion 78. Therefore, when the load is input to the first body portion 16 and the second body portion 18, it is possible to suppress the first left side bonded portion 24 of the first body portion 16 and the second left side bonded portion 74 of the second body portion 18 from being peeled off, and it is possible to suppress the first right side bonded portion 28 of the first body portion 16 and the second right side bonded portion 78 of the second body portion 18 from being peeled off.

Further, the left side spacer 44 is provided between the right side portion 38 that constitutes the first front side connecting portion 36 on the left side of the first body portion 16 in the vehicle right-left direction and the rear surface of the bumper reinforcement 14 in the vehicle front-rear direction. The front surface of the left side spacer 44 in the vehicle front-rear direction is in contact with the rear surface of the bumper reinforcement 14 in the vehicle front-rear direction, and the rear surface of the left side spacer 44 in the vehicle front-rear direction is in contact with the front surface of the right side portion 38 in the vehicle front-rear direction of the first front side connecting portion 36 on the left side in the vehicle right-left direction. Therefore, the load from the front of the vehicle that is input to the bumper reinforcement 14 is input to the right side portion 38 of the first front side connecting portion 36 on the left side in the vehicle right-left direction via the left side spacer 44.

Here, the angle θ1 between the direction in which the right side portion 38 of the first front side connecting portion 36 on the left side in the vehicle right-left direction extends from the front end of the first leg plate portion 22 in the vehicle front-rear direction on the left side in the vehicle right-left direction and the longitudinal direction of the first leg plate portion 22 on the left side in the vehicle right-left direction is 90 degrees or less toward the left side of the vehicle. Thus, the inclination angle between the direction of the load from the front of the vehicle that is input from the left side spacer 44 to the right side portion 38 of the first front side connecting portion 36 and the longitudinal direction of the first leg plate portion 22 on the left side in the vehicle right-left direction is reduced. Therefore, such a load from the front of the vehicle is likely to act on the first leg plate portion 22 on the left side in the vehicle right-left direction as a compressive load along the longitudinal direction of the first leg plate portion 22 on the left side in the vehicle right-left direction.

On the other hand, the right side spacer 50 is provided between the left side portion 46 that constitutes the first front side connecting portion 36 on the right side of the first body portion 16 in the vehicle right-left direction and the rear surface of the bumper reinforcement 14 in the vehicle front-rear direction. The front surface of the right side spacer 50 in the vehicle front-rear direction is in contact with the rear surface of the bumper reinforcement 14 in the vehicle front-rear direction, and the rear surface of the right side spacer 50 in the vehicle front-rear direction is in contact with the front surface of the left side portion 46 in the vehicle front-rear direction of the first front side connecting portion 36 on the right side in the vehicle right-left direction. Thus, the load from the front of the vehicle that is input to the bumper reinforcement 14 is input to the left side portion 46 of the first front side connecting portion 36 on the right side in the vehicle right-left direction via the right side spacer 50.

Here, the angle θ2 between the direction in which the left side portion 46 of the first front side connecting portion 36 on the right side in the vehicle right-left direction extends from the front end of the first leg plate portion 22 in the vehicle front-rear direction on the right side in the vehicle right-left direction and the longitudinal direction of the first leg plate portion 22 on the right side in the vehicle right-left direction is 80 degrees or more and 90 degrees or less toward the right side of the vehicle. Thus, the inclination angle between the direction of the load from the front of the vehicle that is input from the right side spacer 50 to the left side portion 46 of the first front side connecting portion 36 and the longitudinal direction of the first leg plate portion 22 on the right side in the vehicle right-left direction is reduced. Therefore, such a load from the front of the vehicle is likely to act on the first leg plate portion 22 on the right side in the vehicle right-left direction as a compressive load along the longitudinal direction of the first leg plate portion 22 on the right side in the vehicle right-left direction.

Although detailed description based on the drawings is omitted, the second front side connecting portions 86 of the second body portion 18 basically have the same configuration as the first front side connecting portions 36 of the first body portion 16. Therefore, such a load from the front of the vehicle as described above is likely to act on both second leg plate portions 72 of the second body portion 18 as a compressive load along the longitudinal direction of the second leg plate portions 72.

As described above, in the present embodiment, even when the longitudinal direction of the bumper reinforcement 14 is inclined in the vehicle front-rear direction with respect to the vehicle width direction, the load that is input from the bumper reinforcement 14 to the crash box 10 via the left side spacer 44 or the right side spacer 50 is likely to be input to the crash box 10 as a compressive load along the longitudinal direction of the first leg plate portions 22 of the first body portion 16 and the second leg plate portions 72 of the second body portion 18 of the crash box 10. As a result, the crash box 10 is likely to be compressed and deformed in the penetrating direction of the crash box 10 due to the load from the front of the vehicle at the time of a vehicle frontal collision, and the amount of load absorbed by the deformation of the crash box 10 can be stabilized.

Second Embodiment

Figure 6:
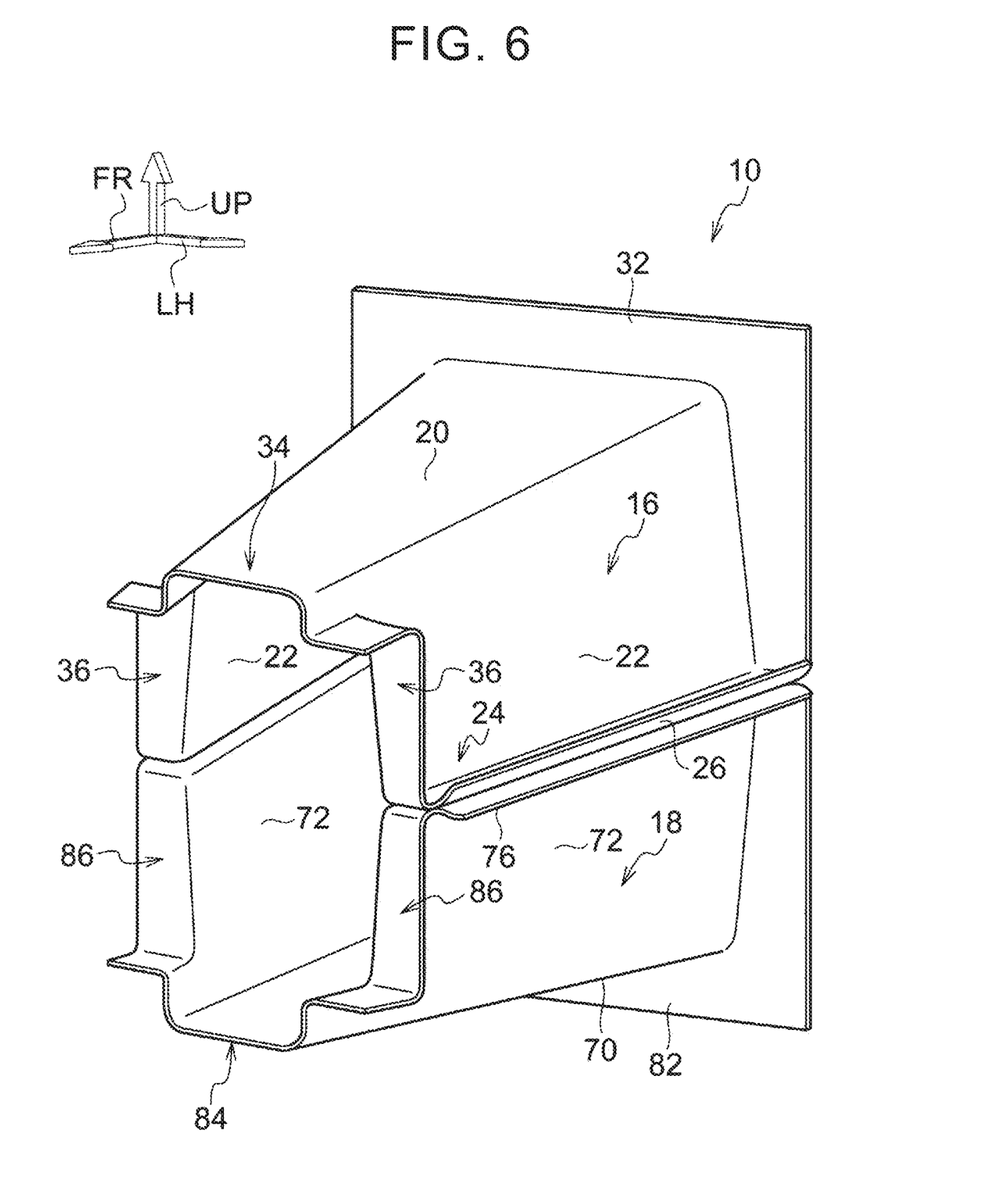
FIG. 6 is a perspective view of a load absorbing member according to a second embodiment as viewed from the front left side of a vehicle.

Next, a second embodiment will be described. As shown in FIG. 6, in the present embodiment, the first extending portion 34 has an inverted U-shape that opens toward the lower side of the vehicle when viewed in the vehicle front-rear direction, and the second extending portion 84 has a U-shape that opens toward the upper side of the vehicle when viewed in the vehicle front-rear direction. The present embodiment having such a configuration can basically exhibit the same effects as those of the first embodiment.

In each of the above-described embodiments, the first body portion 16 includes the first extending portion 34 as an extending portion, and the second body portion 18 includes the second extending portion 84 as an extending portion. However, for example, the configuration in which only one of the first extending portion 34 and the second extending portion 84 is provided and the other is not provided may be employed.

In each of the above-described embodiments, the first body portion 16 includes the first left side reinforcing portion 26 and the first right side reinforcing portion 30, and the second body portion 18 includes the second left side reinforcing portion 76 and the second right side reinforcing portion 80. However, for example, the first body portion 16 may have a configuration that includes the first left side reinforcing portion 26 and does not include the first right side reinforcing portion 30, and the second body portion 18 may have a configuration that includes the second right side reinforcing portion 80 and does not include the second left side reinforcing portion 76. The first body portion 16 may have a configuration that includes the first right side reinforcing portion 30 and does not include the first left side reinforcing portion 26, and the second body portion 18 may have a configuration that includes the second left side reinforcing portion 76 and does not include the second right side reinforcing portion 80. That is, any configuration may be employed as long as it includes one of the first left side reinforcing portion 26, the first right side reinforcing portion 30, the second left side reinforcing portion 76, and the second right side reinforcing portion 80.

Further, in each of the above-described embodiments, each of the first left side reinforcing portion 26 and the first right side reinforcing portion 30 extends toward the upper side of the vehicle from the first left side bonded portion 24 and the first right side bonded portion 28, respectively. However, at least one of the first left side reinforcing portion 26 and the first right side reinforcing portion 30 may extend toward the lower side of the vehicle. Further, in each of the above-described embodiments, each of the second left side reinforcing portion 76 and the second right side reinforcing portion 80 extends toward the lower side of the vehicle from the second left side bonded portion 74 and the second right side bonded portion 78, respectively. However, at least one of the second left side reinforcing portion 76 and the second right side reinforcing portion 80 may extend toward the upper side of the vehicle.

Further, each of the above-described embodiments has been described by taking the vehicle load absorbing structure at the front portion of the vehicle as an example. However, the present disclosure may be applied to the vehicle load absorbing structure at the rear portion of the vehicle, in which the crash box is disposed in front of the bumper reinforcement at the rear portion of the vehicle in the vehicle front-rear direction, and the supporting member such as the side member is disposed in front of the crash box in the vehicle front-rear direction.

Furthermore, each of the above-described embodiments has a configuration in which the load absorbing member according to the present disclosure is applied to the crash box 10. However, the load absorbing member according to the present disclosure is not limited to the crash box 10 and can be widely applied as long as it is provided in the load transmission path at the time of a vehicle collision and is compressed and deformed by the load at the time of the vehicle collision to absorb a part of the load.

What is claimed is:

1. A load absorbing member comprising:
a pair of body portions made of a fiber reinforced resin material and integrated with each other to define a closed cross-sectional shape that extends in a predetermined penetrating direction, the body portions being configured to deform to crush in the penetrating direction by a load acting in the penetrating direction to absorb at least a part of the load;
bonded portions that are provided in each of the body portions, the bonded portions of a first body portion of the body portions and the bonded portions of a second body portion of the body portions being bonded to each other facing each other such that the first body portion and the second body portion are integrated with each other; and
an extending portion provided on an opposite side of an input position of the load in the body portions from the bonded portions of the first body portion and the bonded portions of the second body portion, the extending portion extending from at least one of the body portions toward a direction opposite to a direction of the load with respect to the input position of the load.

2. The load absorbing member according to claim 1, wherein the extending portion is provided on both of the body portions.

3. The load absorbing member according to claim 1, further comprising a reinforcing portion that extends from at least one of the bonded portions of the body portions toward the bonded portions of the second body portion or toward the opposite side of the bonded portions of the second body portion, the reinforcing portion reinforcing a rigidity against deformation of the bonded portions of the first body portion in a direction in which the bonded portions of the first body portion are peeled off from the bonded portions of the second body portion.

4. A vehicle load absorbing structure comprising:
a crash box having a pair of body portions made of a fiber reinforced resin material, each of the body portions including bonded portions that are bonded to each other facing each other in a vehicle up-down direction to define a closed cross-sectional shape that extends in a vehicle front-rear direction, the crash box being configured to be compressed and deformed to crush in the vehicle front-rear direction by a load from an outside in the vehicle front-rear direction to absorb at least a part of the load, the crash box further including an extending portion provided in the vehicle up-down direction from an input position of the load and extending from at least one of the body portions outward in the vehicle front-rear direction with respect to the input position of the load;

a supporting member provided inward of the crash box in the vehicle front-rear direction and configured to support the crash box that receives the load from inside in the vehicle front-rear direction; and a bumper reinforcement provided outward of the crash box in the vehicle front-rear direction and configured to transmit the load to the crash box.

5. The vehicle load absorbing structure according to claim 4, wherein the extending portion extends from, of the body portions, the body portion on an upper side in the vehicle up-down direction so as to extend above the bumper reinforcement in the vehicle up-down direction, and extends from the body portion on a lower side in the vehicle up-down direction so as to extend below the bumper reinforcement in the vehicle up-down direction.

6. The vehicle load absorbing structure according to claim 4, wherein the crash box includes a reinforcing portion that extends from at least one of the bonded portions of the body portions toward the bonded portions of a second body portion of the body portions or toward the opposite side of the bonded portions of the second body portion, the reinforcing portion reinforcing a rigidity against deformation of first bonded portions in a direction in which the first bonded portions are peeled off from second bonded portions.

7. The vehicle load absorbing structure according to claim 4, wherein:

each of the body portions includes
a pair of leg plate portions each extending in the vehicle front-rear direction and constituting a portion of the body portion in a vehicle width direction, and
facing portions extending from front ends of the leg plate portions in the vehicle front-rear direction outward in the vehicle width direction and disposed rearward of a rear surface of the bumper reinforcement in the vehicle front-rear direction, angles between portions of the facing portions and the leg plate portions being 90 degrees or less as viewed in the vehicle up-down direction; and the vehicle load absorbing structure includes a load transmitting member that is in contact with the rear surface of the bumper reinforcement in the vehicle front-rear direction in a state in which a front surface of the load transmitting member in the vehicle front-rear direction faces the rear surface of the bumper reinforcement in the vehicle front-rear direction and that is in contact with a front surface of the facing portion in the vehicle front-rear direction in a state in which a rear surface of the load transmitting member in the vehicle front-rear direction faces the front surface of the facing portion in the vehicle front-rear direction, the load transmitting member configured to transmit the load from a front of the vehicle that is transmitted via the bumper reinforcement to the facing portions.

* * * * *